(12) United States Patent
Westmacott

(10) Patent No.: US 10,645,311 B2
(45) Date of Patent: May 5, 2020

(54) SYSTEM AND METHOD FOR AUTOMATED CAMERA GUARD TOUR OPERATION

(71) Applicant: Sensormatic Electronics, LLC, Boca Raton, FL (US)

(72) Inventor: Ian Westmacott, Tewksbury, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/106,922

(22) Filed: Aug. 21, 2018

(65) Prior Publication Data

US 2019/0007630 A1    Jan. 3, 2019

Related U.S. Application Data

(63) Continuation of application No. 14/498,263, filed on Sep. 26, 2014, now Pat. No. 10,070,077.

(51) Int. Cl.
*H04N 7/18* (2006.01)
*H04N 5/335* (2011.01)
(Continued)

(52) U.S. Cl.
CPC ....... *H04N 5/335* (2013.01); *G08B 13/19691* (2013.01); *H04N 5/23206* (2013.01);
(Continued)

(58) Field of Classification Search
CPC .... H04N 5/335; H04N 5/247; H04N 5/23206; H04N 7/188; H04N 7/181; H04N 5/77;
(Continued)

(56) References Cited

U.S. PATENT DOCUMENTS 6,867,799 B2    3/2005   Broemmelsiek
2005/0185053 A1  8/2005   Berkey et al.
(Continued)

FOREIGN PATENT DOCUMENTS

EP          1 566 781        4/2008

OTHER PUBLICATIONS

American Dynamics. "Configuration and User Guide: Illustra 625 PTZ Camera." Tyco Security Products, 2013.
(Continued)

*Primary Examiner* — Richard T Torrente
(74) *Attorney, Agent, or Firm* — HoustonHogle LLP

(57) ABSTRACT

A system and method for automated operation of a camera system provides for a positioning system that moves the camera system to a field of view to search for objects or events of interest to track. If objects or events of interest are detected prior to the expiration of a dwell timer, the dwell timer is interrupted and tracking of the objects or events of interest is initiated. To prevent the security camera from being distracted indefinitely by unimportant objects, the positioning system changes the field of view of the security system upon expiration of a track timer. Alternatively, if the security camera does not identify an object to track prior to expiration of a dwell timer, then the positioning system changes the field of view of the camera system to search for other objects or events of interest.

24 Claims, 6 Drawing Sheets

(51) Int. Cl.
 H04N 5/232 (2006.01)
 H04N 5/247 (2006.01)
 G08B 13/196 (2006.01)
 H04N 5/262 (2006.01)
 H04N 5/77 (2006.01)
 H04N 5/44 (2011.01)

(52) U.S. Cl.
 CPC ......... *H04N 5/23296* (2013.01); *H04N 5/247* (2013.01); *H04N 5/2628* (2013.01); *H04N 5/77* (2013.01); *H04N 7/181* (2013.01); *H04N 7/188* (2013.01); *G08B 13/19663* (2013.01); *G08B 13/19673* (2013.01); *G08B 13/19695* (2013.01); *H04N 2005/4428* (2013.01)

(58) Field of Classification Search
 CPC ............ H04N 5/2628; H04N 5/23296; H04N 2005/4428; G08B 13/19691; G08B 13/19673; G08B 13/19663; G08B 13/19695
 USPC ........................................................ 348/159
 See application file for complete search history.

(56) References Cited

U.S. PATENT DOCUMENTS

| | | | |
|---|---|---|---|
| 2006/0104625 A1* | 5/2006 | Oya | G03B 15/16 396/153 |
| 2006/0238617 A1 | 10/2006 | Tamir | |
| 2009/0096871 A1* | 4/2009 | Kuwano | G06K 9/00228 348/169 |
| 2009/0256912 A1* | 10/2009 | Rosenberg | G01S 3/7864 348/154 |
| 2013/0188070 A1* | 7/2013 | Lee | H04N 5/23219 348/222.1 |

OTHER PUBLICATIONS

AXIS Communications. "AXIS Q6042 PTZ Dome Network Camera: User Manual." Oct. 9, 2014.
Bosch. "AutoDome 800 Series HD PTZ Camera: VG5 800 Series, Installation Manual." Bosch Security Systems, Inc., Aug. 2012.
Panasonic. "Super Dynamic HD Dome Network Camera WV-SC385." Aug. 20, 2014.
"Pan-tilt-zoom camera." Wikipedia, Aug. 20, 2014. Web. Accessed Jan. 11, 2015. <http://en.wikipedia.org/wiki/Pan-tilt-zoom_camera>.
"SightTracker Auto Tracking PTZ Controller." sightlogix, 2013. Web. Accessed Jan. 11, 2015. <http://www.sightlogix.com/sighttracker>.
International Search Report and Written Opinion of the International Searching Authority, dated Dec. 8, 2015, from International Application No. PCT/US2015/052049, filed Sep. 24, 2015. Ten pages.
International Preliminary Report on Patentability, dated Apr. 6, 2017, from International Application No. PCT/US2015/052049, filed Sep. 24, 2015. Seven pages.
Examination Report, dated Nov. 14, 2019, from Euroepan Patent Application No. 15 778 132.9, filed Mar. 27, 2017. 6 pages.

* cited by examiner

SYSTEM AND METHOD FOR AUTOMATED CAMERA GUARD TOUR OPERATION

RELATED APPLICATIONS

This application is a Continuation of U.S. patent application Ser. No. 14/498,263, filed on Sep. 26, 2014, which is incorporated herein by reference in its entirety.

BACKGROUND OF THE INVENTION

Security systems are often installed within residential, commercial, industrial, or governmental buildings. Some examples of these buildings include offices, hospitals, casinos, warehouses, academic institutions, or shopping malls. The security systems are generally comprised of security devices such as security camera systems (or camera systems), motion sensors, alarms, fingerprint scanners, and access control readers, to a list a few examples.

Many of the security systems utilize motorized security camera systems to capture images, such as video content (or data), of scenes. One example of a motorized security camera system is a pan-tilt-zoom (or PTZ) camera system. Typically, PTZ camera systems are manually operated by an operator (e.g., security personnel) via a control mechanism, such as a joystick.

One problem with manually operated security camera systems is that when the security camera systems are not in use, they are often left facing in a "wrong" direction when events of interest are occurring. Thus, the camera systems often fail to capture objects or events of interest.

To alleviate the problem of potentially missing objects or events of interest, many security camera systems implement automated guard tours. A guard tour is comprised of a series of preset fields of view (camera or lens orientations) and zoom levels, which are referred to as set points. In operation, a positioning system of the security camera system automatically moves the camera system from one set point to another in a predefined order or at random. This movement from one set point to another changes the lens orientation of the camera system and thus also changes the field of view of the camera system.

Even when an automated guard tour is running, the security camera systems may still miss events of interest. This is because the guard tour is often comprised of set points and the security camera systems may be positioned at a "wrong" set point when the event is occurring. Alternatively, the events of interest could occur in a field of view that is not covered by any of the set points of the camera systems. Additionally, if objects or events of interest are in motion, the objects or events may move out of the field of view of the security camera system. Yet another problem with the guard tours is that the set points include predefined zoom levels. Thus, the security camera systems may be zoomed out too far to capture details of the object or event. Similarly, the security camera systems may be zoomed in too far and miss events due to a narrow field of view of the set point.

Recently, video content analysis tools have been developed for security camera systems to enable the security camera systems to automatically identify and track objects or events of interest. This feature may even be combined with guard touring. Once the motion is detected, the security camera systems suspend the guard tour and initiate tracking of the objects or events of interest.

SUMMARY OF THE INVENTION

Security camera systems that implement automatic tracking still suffer from several problems. The first problem occurs when multiple objects or events of interest are detected (e.g., when the camera systems detect multiple cars moving in different directions at the same time). In this case, the camera systems must determine which of the objects to follow. Occasionally, the camera systems choose the wrong object to track. The second problem is that the security camera systems may become distracted by "uninteresting" objects or events (e.g., leaves blowing in the wind). These uninteresting objects or events cause the camera systems to indefinitely track uninteresting objects or events while interesting events are occurring elsewhere.

The present system is directed to automated camera system operation that includes video analytics. More specifically, the system provides for security camera systems that implement intelligent guard tours, which enable the camera systems to automatically track events or objects of interest, but also prevent the security camera systems from being distracted indefinitely by unimportant objects or events.

In more detail, the security camera systems search for objects or events of interest to track and dwell timers are initiated. If the dwell timer expires before objects of interest are detected, then the positioning system of the security camera moves/changes the field of view of the camera system to search for other objects or events of interest to track. Alternatively, if objects or events of interest are identified prior to the expiration of the dwell timer, the dwell timers are interrupted and automatic tracking of the objects or events of interest is initiated. To prevent the security camera system from being distracted indefinitely by unimportant objects, the lens system is moved to a different position (i.e., set point) after a predefined period of time (e.g., the expiration of a track timer).

In general, according to one aspect, the invention features a method of automated operation of a motorized camera system. The method includes tracking objects of interest by controlling a positioning system of the camera system. Additionally, the method includes suspending tracking of the objects and controlling the positioning system to change the field of view of the camera system and then searching for new objects of interest to track when the objects have been tracked for a time.

In embodiments, the method further comprises starting a track timer in response to detecting new objects of interest to track, tracking the new objects by controlling the positioning system, and controlling the positioning system to change the field of view of the camera system to search for new objects of interest to track upon the expiration of the track timer.

Generally, the next field of view of the camera system is determined by retrieving a set point from a series of stored set points. Alternatively, the next field of view of the camera system is based on a current field of view of the camera system after suspending tracking of a current object.

Typically, if objects of interest are not identified prior to expiration of a dwell timer, the positioning system changes the field of view of the camera system to search for new objects of interest. Alternatively, if new objects of interest are identified, the new objects of interest are tracked by controlling the positioning system of the camera system.

Preferably, the tracking the objects of interest further includes controlling the positioning system and a zoom actuator of the lens system to ensure that the objects of interest are zoomed and centered in the field of view of the camera system.

In a typical implementation, objects of interest are prioritized when multiple objects of interest are identified and then tracking is initiated for the object of interest with the highest priority.

In embodiments, searching for the objects of interest includes detecting objects of interest based on motion, biometric information, and/or license plate information of vehicles, to list a few examples.

Generally, the camera system is programmed with a series of set points that correspond to different fields of view of the camera system.

In general, according to another aspect, the invention features a security camera system, which includes a positioning system that moves a field of view of the camera system. Additionally, the system includes a lens system and imaging sensor that generate images of the field of view of the camera system.

The system further includes a video analysis system that identifies objects of interest within the images, tracks the objects for a time, and then suspends the tracking to search for new objects of interest to track after the positioning system changes the field of view of the camera system.

In one embodiment, the video analysis system is implemented internally on the security camera system. In an alternative embodiment, the video analysis system is implemented on an external system that accesses images stored possibly to a network video recorder system.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
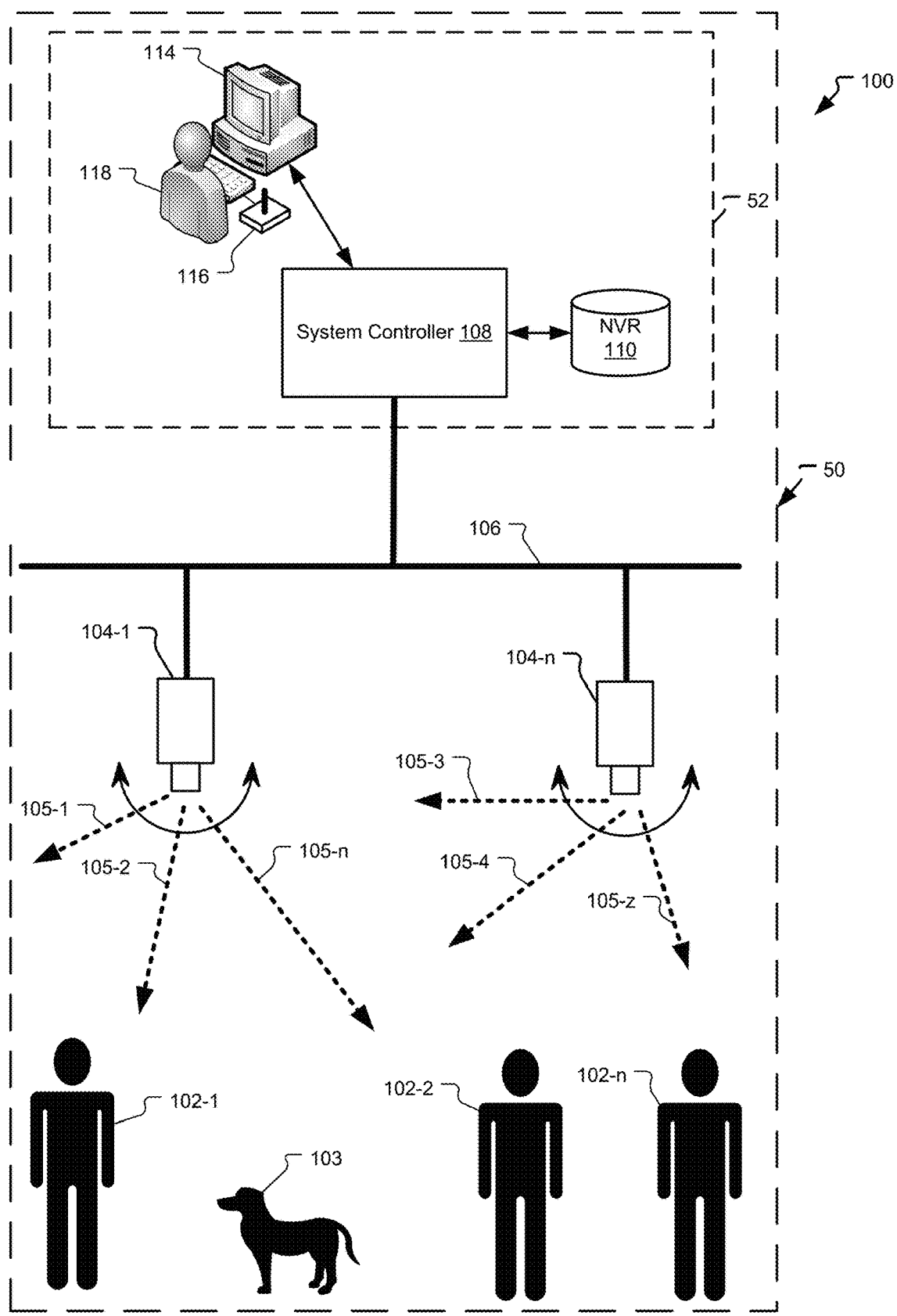
FIG. 1A is a schematic diagram of a security system, which includes motorized security camera systems installed on a network.

FIG. 1A is a block diagram of a security system 100, which includes security camera systems (camera systems) 104-1 to 104-n installed on a network 106.

In the illustrated embodiment, the security system 100 is installed within or around a building 50, such as an office, hospital, casino, warehouse, academic institution, or shopping mall, to list a few examples.

The camera systems 104-1 to 104-n capture a series of images as video data. Alternatively, the camera systems 104-1 to 104-n may capture a series images at predefined intervals (e.g., once every 30 seconds). In a preferred embodiment, the camera systems 104-1 to 104-n use motorized or scanning positioning system such as pan-tilt or pan-tilt-zoom (PTZ) systems.

In a typical implementation, the camera systems 104-1 to 104-n or the controller 108 store set points, which are preset positions of the lens or the camera defined as the triple of a pan angle, a tilt angle, and a zoom level that correspond to different fields of view. In the illustrated example, these set points are shown as arrows 105-1 to 105-n.

While not illustrated, the security system 100 typically includes additional security devices such as motion sensors, alarms/sirens, fingerprint scanners, door controllers, and access control system, (e.g., readers), to a list a few examples.

In a typical implementation, the camera systems 104-1 to 104-n are moved from one set point to another in a predefined order. Alternatively, the camera systems may be repositioned at random. This movement from one set point to the next enables the camera systems to capture video data (e.g., a series of images) in different fields of view. In general, the repositioning of the security camera system to the different set points is often referred to as a guard tour, which is executed automatically by the camera systems 104-1 to 104-n after a period if inactivity or when the operator is not manually controller or steering the camera systems. In an alternative embodiment, the guard tour is an operation mode that is selected by an operator (e.g., security personnel) 118.

In the preferred embodiment, the security camera systems 104-1 to 104-n identify and track objects of interest. In the illustrated example, people 102-1 to 102-n are examples of objects of interest. Other objects of interest include vehicles or unattended items (e.g., boxes or luggage) for example. Additionally, the dog 103 represents a possible distraction (or "uninteresting" object).

In the illustrated embodiment, the camera systems 104-1 to 104-*n* are connected to the network 106, which is typically a public and/or private data network. The network may also include an enterprise network, university network, government network, and/or mobile broadband data network, to list a few examples. In some embodiments, the security network 106 includes wireless portions.

The system controller 108, which is potentially housed in a control room 52 or other secure location, monitors and controls the camera systems 104-1 to 104-*n* via the security network 106. Additionally, the images, such as video data captured by the security camera systems 104-1 to 104-*n* are sent to the system controller 108. The system controller 108 forwards the received video data to a network video recorder (NVR) 110 for storage. The network video recorder (NVR) 110 typically adds time and date information in addition to other meta data to allow the video data to be indexed and reviewed at a later date.

Additionally, the control room or other monitoring location 52 also includes one or more workstations 114, which are operated by one or more operators (e.g., security personnel) 118. In the illustrated example, the workstations 114 include input devices (e.g., joysticks) that enable the operators 118 to manually control the field of view including zoom of the security camera systems 104-01 to 104-*n*.

Figure 1B:
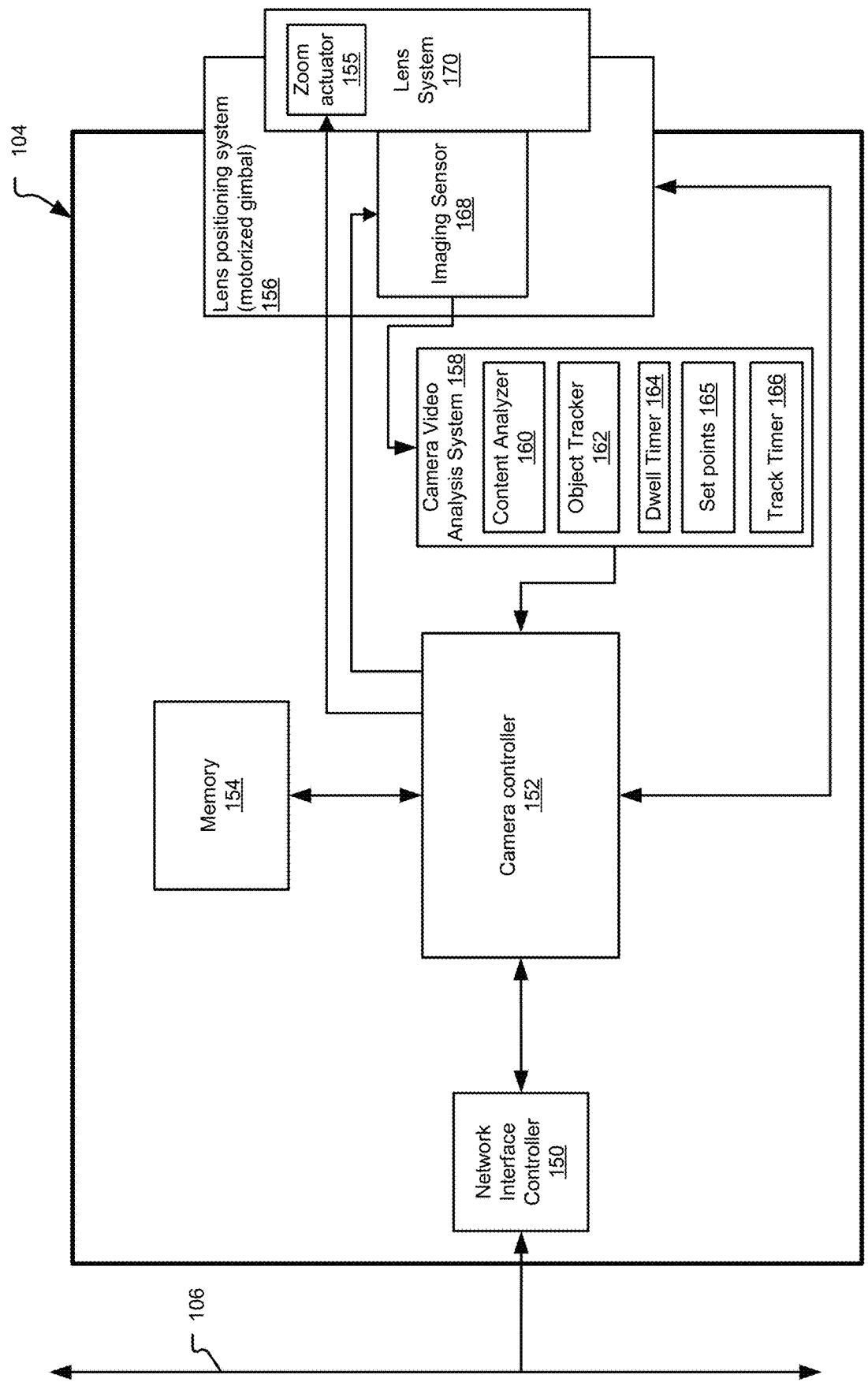
FIG. 1B is a block diagram illustrating a camera system.

FIG. 1B is a block diagram illustrating a camera system 104 according to the present invention.

In the illustrated embodiment, the camera system 104 includes a camera controller 152, which controls an integrated or separate memory 154 and a network interface controller 150.

The security camera system 104 includes an adjustable lens system 170, which typically has one or more optical elements, such as lenses, for zooming and a focusing the camera system. In the illustrated example, the lens system 170 includes a zoom actuator 155 that controls the level of zoom of the lens system 170.

The lens system 170 of the security camera system 104 may include different optics depending on the installation location. For example, the lens system 170 may utilize a wide angle lens, a fisheye lens, or telephoto lens, to list a few examples.

In still other examples, the zoom capability is not provided or a digital zoom is used.

The lens system 170 captures light and directs the captured light to an imaging sensor 168, which converts the captured light into a series of electronic images that form video data. Generally, the imaging sensor 168 is a charge-coupled device (CCD) or a complementary metal—oxide—semiconductor (CMOS) device. The imaging sensor 168 is directly behind the lens system 170 in order to receive the light captured by the lens system 170.

The security camera system 104 further includes a lens positioning system (positioning system) 156, such as a motorized gimbal. In the illustrated example, this positioning system 156 controls the direction and orientation of the lens system 170. The positioning system 156 receives positioning commands from the camera controller 152 and moves the lens system 170 in order to change the field of view of the camera system in response to those received commands. The lens positioning system 156 is typically comprised one or more motors, which adjust a lens orientation (e.g., pan and tilt) of the security camera system 104 and move the lens system 170 to receive light from different fields of view.

The image information captured by the imaging sensor 168 is sent to the camera video analysis system 158. In some examples, this analysis is implemented on a separate video or digital signal processor. In other examples, it is implemented on the camera controller 152.

In the illustrated example, the camera video analysis system 158 includes a content analyzer 160, object tracker 162, dwell timer 164, and track timer 166. Typically, these components are processes executing on a processor or functionality provided by one or more processes executing on the processor. Additionally, the camera video analysis system 158 also stores or accesses a series of set points 165.

The content analyzer 160 utilizes video or image content analysis to detect and track objects or detect events of interest. Some examples of these video content analysis techniques include object identification, motion detection, biometric detection (e.g., human detection or face detection), vehicle detection, and license plate detection.

The object tracker 162 tracks the objects or events of interest and sends positioning commands for the lens positioning system 156. The positioning commands keep the object or event of interest centered in the field of view and fully zoomed, in one implementation.

The dwell timer 164 is a predefined or programmable length of time that the security camera system will remain at a set point (without identifying objects or events of interest) before the security camera system 104 moves to a different set point in the course of performing a guard tour. Similarly, the track timer 166 is a predefined length of time that the security camera system will track an object or event of interest before the positioning system of the security camera system 104 breaks off the tracking of the object and potentially moves to a different set point or position.

The stored set points 165 are preset camera positions that are programmed into the security camera systems 104-1 to 104-*n*. These set points define fields of view, which are based on the lens orientations, and zoom levels of the camera systems 104-1 to 104-*n*. In the preferred embodiment, each set point is the triple of a pan angle, a tilt angle, and a zoom level. Often the set points are defined at the time of installation and will typically define fields of view within the camera system's range of movement that are associated potential areas of activity such as doorways, desks, or hallways, for example.

The memory 154 is typically a non-volatile data storage element. In general, the memory 154 stores software code executed by the camera controller 152 and/or video analysis system 158 (e.g., software to control the lens position system 156 and drivers for the network interface controller 150). Additionally, the memory 154 may also buffer and/or store captured video data and/or the set points.

The network interface controller (NIC) 150 enables the security camera system 104 to communicate over the network 106 and allows the image data be transmitted to the system controller 108, the workstation 114, and/or the network video recorder (NVR) 110. Additionally, the network interface controller 150 allows for information or instructions to be received from the system controller 108 or workstation 114, for example.

While not illustrated, the camera systems may include additional components (or features). For example, the security camera systems may include a microphone and amplifier circuit to capture, filter, or enhance captured audio. Additionally, the camera system may further include infrared illumination to allow the camera systems operate in darkness or low-light conditions (i.e., "night vision").

Figure 1C:
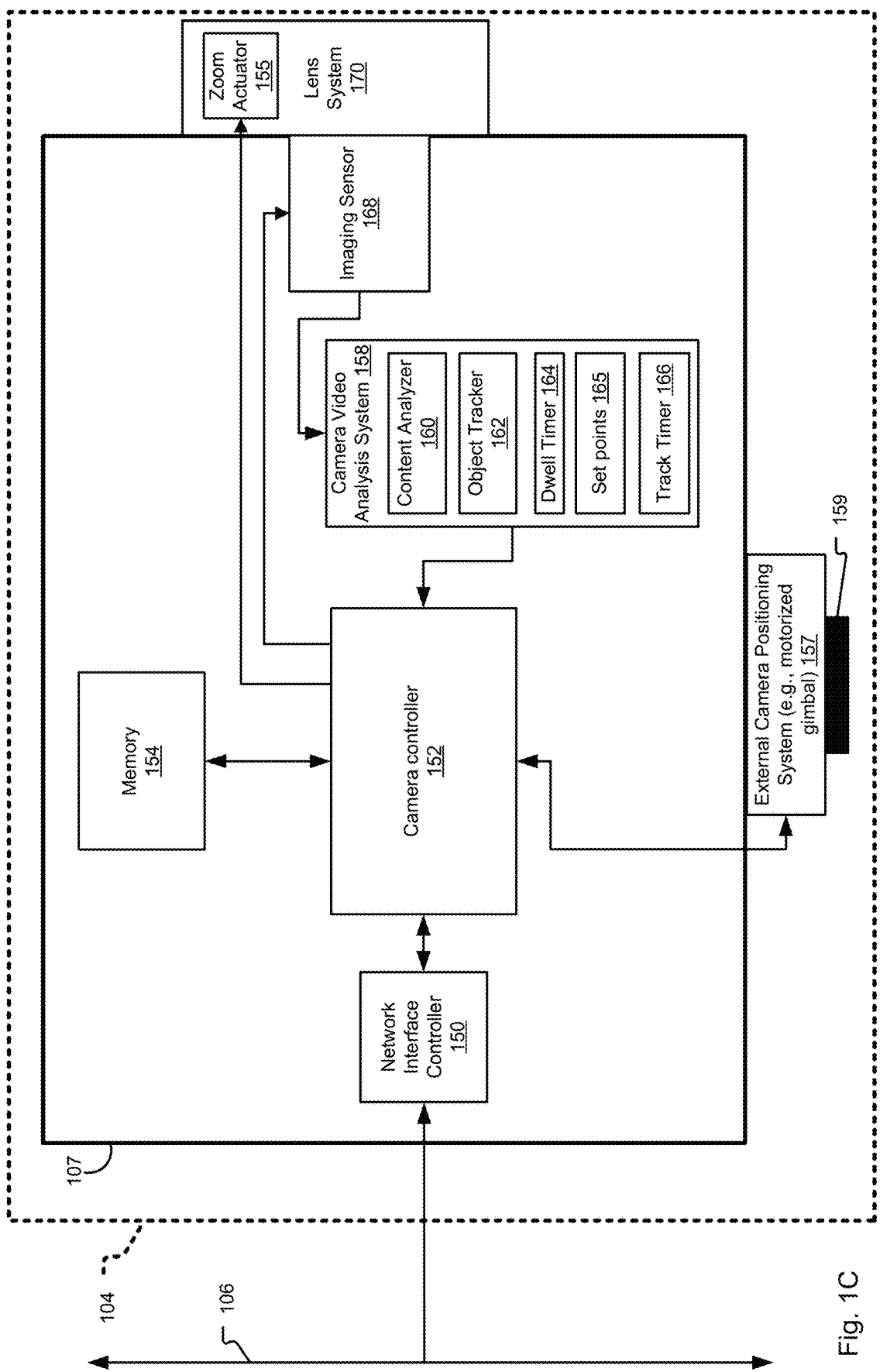
FIG. 1C is a block diagram illustrating an alternative embodiment of the camera system, which includes an external camera positioning system.

FIG. 1C is a block diagram illustrating an alternative embodiment of the camera system 104, which is comprised of a security camera 107 and an external camera positioning system 159.

In general, the illustrated embodiment is nearly identical FIG. 1B. However, in this embodiment, the positioning system is an external camera positioning system 157. That is, the positioning system 157 is external to the security camera 107 and controls the pan and tilt of the camera 107 from the exterior of the security camera 107.

In one embodiment, the external camera positioning system 157 is a motorized gimbal system. In another embodiment, the external camera positioning system 157 is a rail system, which moves the camera system 104 along one or more rails to keep objects of interest in the field of view. In yet another embodiment, the external camera positioning system 157 is a cable system from which the camera is suspended. This system typically has two or more wires to move the camera over different areas.

Typically, the external camera positioning system 157 is secured to a mounting point 159, which enables the camera system to be installed on poles, walls, or ceilings for example.

Figure 2:
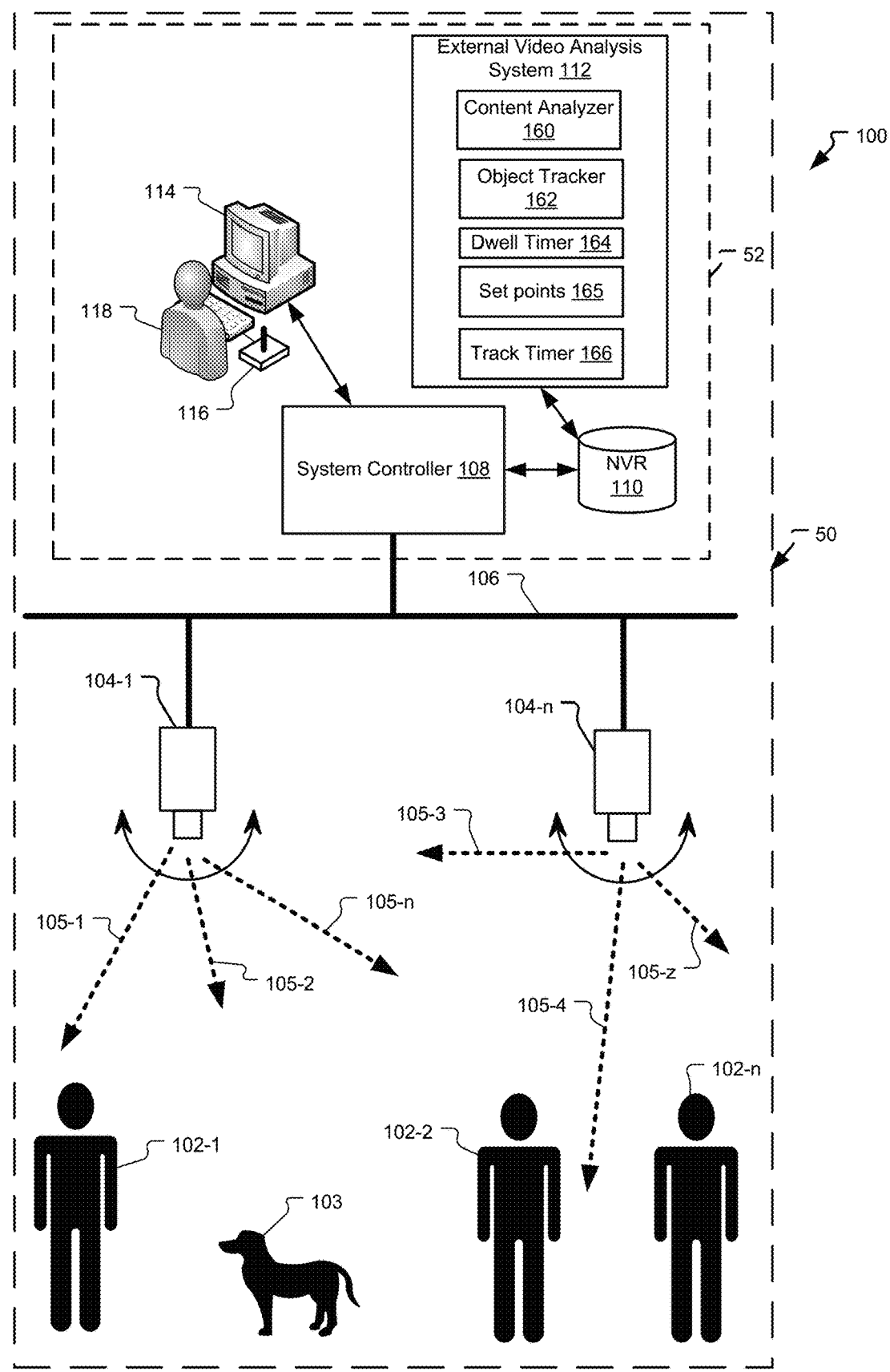
FIG. 2 is a block diagram illustrating an alternative embodiment of the security system in which the video analysis system is external to the security camera system.

FIG. 2 is a block diagram illustrating an alternative embodiment of the security system 100 in which the video analysis system 112 is external to the security camera systems 104-1 to 104-n.

The embodiment illustrated is nearly identical to the embodiment illustrated with respect to FIG. 1A. In this embodiment, however, video analysis is performed by an external video analysis system 112, which analyzes the video data in real time as the video data are received from the camera systems and/or stored to the network video recorder 110. In this example, the video analysis system analyzes the image information from one or more camera systems simultaneously and then sends back positioning and tracking commands.

Figure 3:
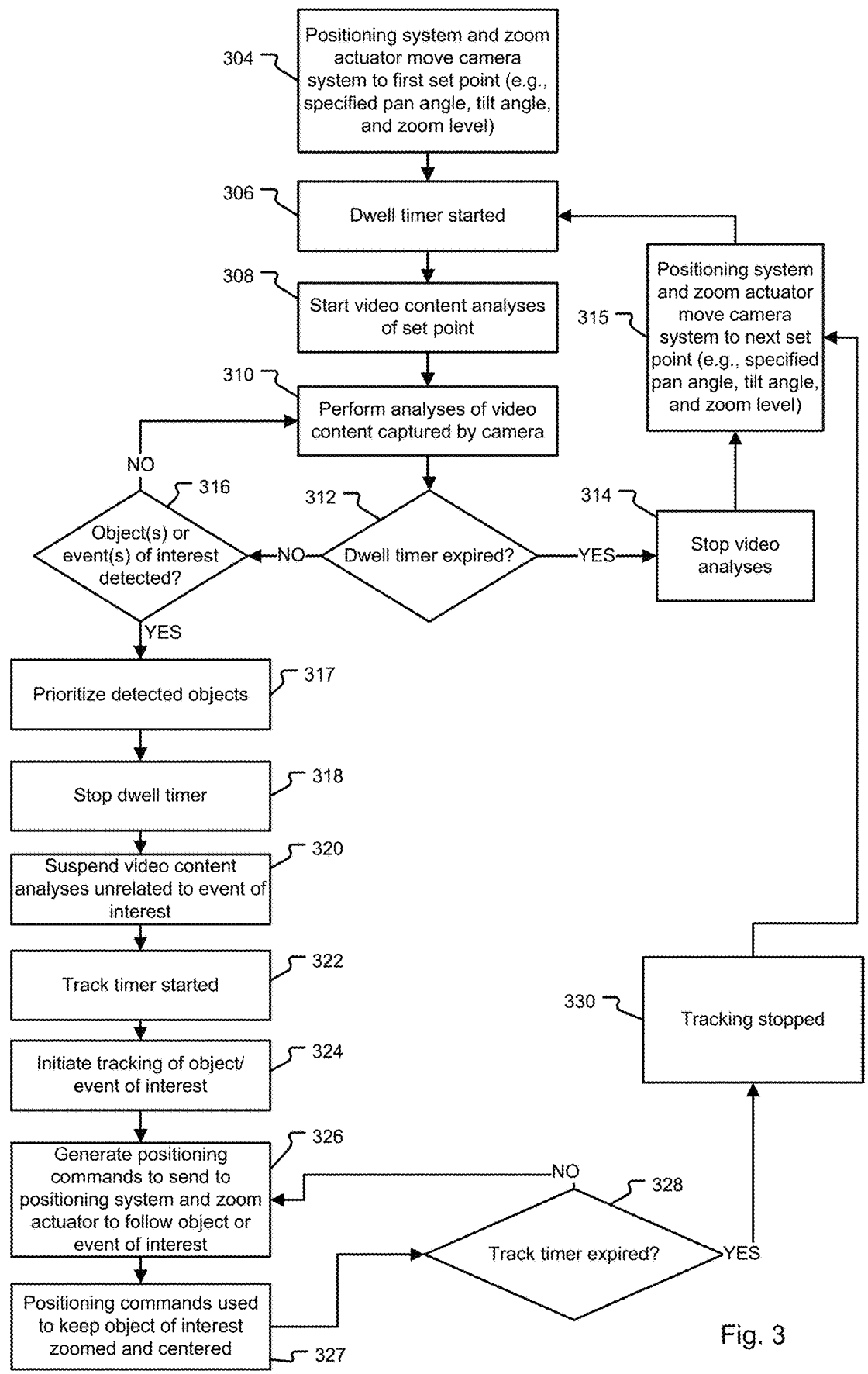
FIG. 3 is a flowchart illustrating the steps performed by the security camera systems to identify and track objects of interest.

FIG. 3 is a flowchart illustrating the steps performed by the security camera systems 104-1 to 104 and to identify and track objects of interest.

In the first step 304, the positioning system (e.g., reference numeral 156 or 157) and zoom actuator 155 move the camera system to the position of a first or initial set point (e.g., field of view), which is often defined by a pan angle, tilt angle, and zoom level. Next, the dwell timer 164 is started in step 306. This dwell timer defines the length of time that the security camera system remains at the set point before moving to a different set point. Then, the video content analysis is started for the set point in step 308 and the video analysis system (e.g., camera video analysis system 158 or the external video analysis system 112) performs analysis of the captured video content in step 310.

If the dwell timer 164 has expired (step 312), then the video analysis system stops the analysis of the video data in step 314. In the next step 315, the positioning system and zoom actuator 155 move the camera system to the next set point. Alternatively, if the dwell timer 164 has not expired, then the video analysis system determines whether objects or events of interests have been detected in step 316.

If objects or events of interest have not been detected, then the video analysis system continues to analyze the video data captured by the security camera system 104 at the current set point in step 310. If, however, objects or events of interest are detected, then the video analysis system prioritizes the detected objects or events in step 317. Additionally, the dwell timer is stopped in step 318. Next, the video analysis system suspends the video data analysis for objects unrelated to the objects or events of interest in step 320. In the next step 322, a track timer 166 is started. In general, this track timer 166 defines the length of time that the security camera systems 104-1 to 104-n track an object or event of interest before breaking off the tracking of the object and moving to a different set point or new position.

In the next step 324, the object tracker 162 initiates tracking of the objects or events of interest. In step 326, positioning commands are generated, which are then sent to the positioning system and the zoom actuator 155. These positioning commands enable the camera system 104 to follow the objects or events of interest and maintain those object or events within the field of view of the camera system. In a preferred embodiment, the positioning commands are used to keep the objects or events of interest zoomed and centered in a field of view of the security camera system in step 327.

If the track timer 166 has not expired (in step 328), then the video analysis system continues to track the objects or events of interest. Conversely, if the track timer has expired, then tracking is stopped in step 330. The positioning system and zoom actuator 155 then move the camera system 104 to the next set point.

Figure 4:
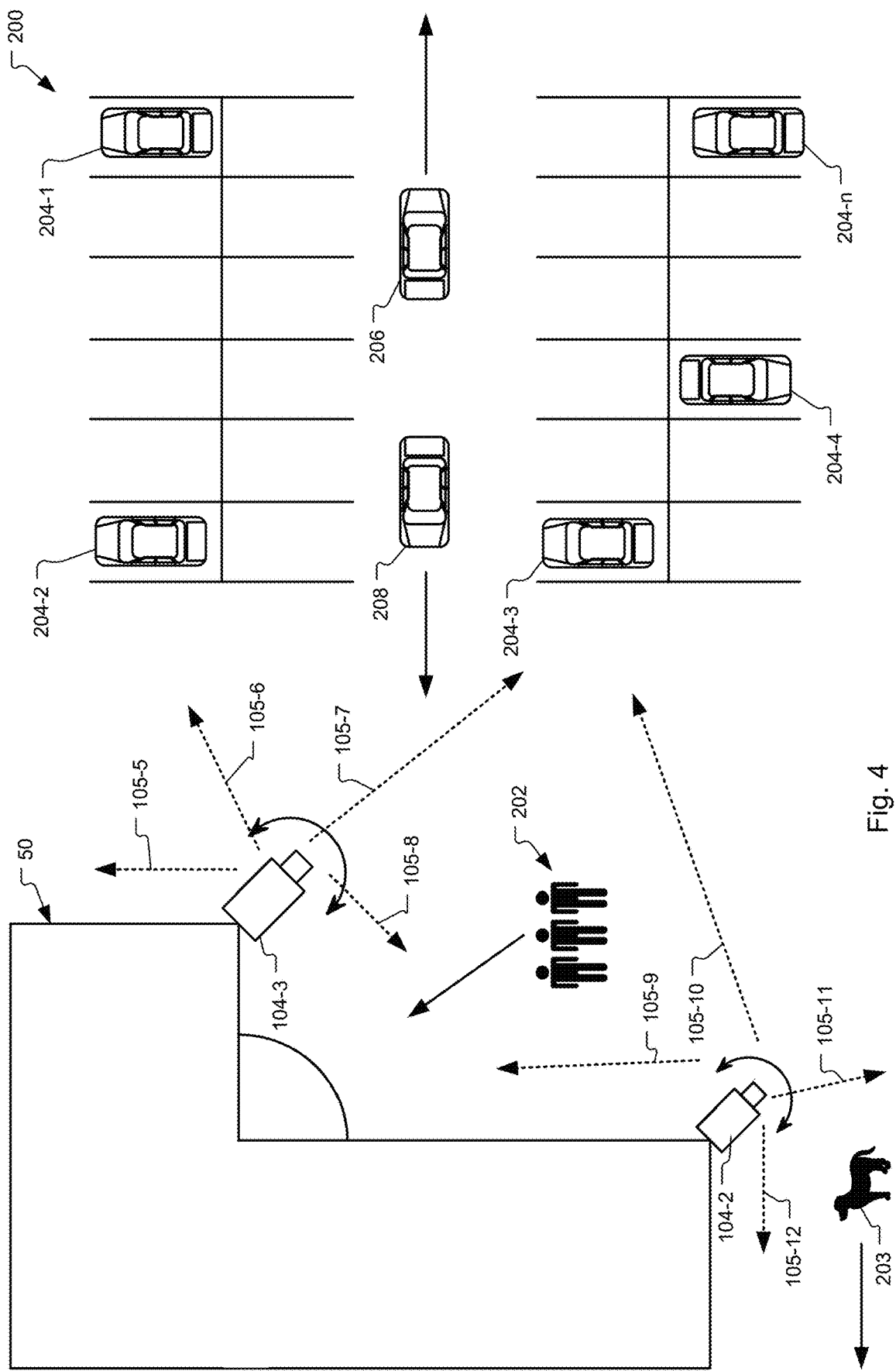
FIG. 4 illustrates an example security camera systems installed on the exterior of a building to monitor areas around the building.

FIG. 4 illustrates an example of security camera systems 104-2, 104-3 installed on the exterior of a building 50 to monitor areas around the building 50.

In the illustrated example, the security camera systems 104-2, 104-3 monitor a parking lot 200 and an entrance area of the building 50. While only two camera systems are illustrated in the example, a typical security system may include additional camera systems and/or security devices (e.g., motion detectors, microphones) located around the perimeter of the building 50. Additionally, security systems often include multiple camera systems installed at the same location. This allows the security system 100 to simultaneously track multiple objects or events of interest from the same vantage point. Alternatively, one or cameras may be used to track objects or events of interest while the other cameras continue operating in guard tour mode.

Each of the camera systems 104-2, 104-3 stores a series of set points, which are illustrated as the dotted arrows 105-5 to 105-8 and 105-9 to 105-12. In operation, the positioning systems of the camera systems 104-2, 104-3 will move the camera systems from one set point to the next to search for objects or events of interest to track.

Within the parking lot 200 are "uninteresting" objects (e.g., parked cars 204-1 to 204-n). Conversely, a group of people 202 moving towards the entrance of the building 50 and moving cars 208, 206 are objects of interest.

In a typical implementation, the objects or events of interest are prioritized. For example, the group of the people 202 might be assigned the highest priority because they are moving towards the entrance of the building and are the closest objects to the building.

In some embodiments, the system controller 108 provides instructions to each security camera system to indicate which objects or events of interest should be tracked by the camera systems. This prevents multiple camera systems from focusing on the same object or event of interest while other objects or events of interest remained untracked. Illustrated by way of example, the car 208 would likely be identified by both of the security camera systems 104-2, 104-3. As a result, both camera systems might initiate tracking this object of interest. To prevent both of these camera systems from tracking the same event of interest (and ignoring, for example, the group of people), the system controller 108 (or possibly an operator 118) assigns objects of interest to each of security camera systems.

According to the invention, when the camera systems 104-2, 104-3 are operating in an automated fashion, they will automatically track objects of interest by controlling the positioning system of the camera system to change the fields of view. For example, camera system 104-3 may track the group of people 202 as they move toward the building 50.

This group 202 will only be tracked for a set time period defined by the track timer. After expiration of that time period, camera system 104-3 will suspend tracking of the group 202 and change the field of view (e.g., by moving the lens system or the camera itself) of the camera system to a different position such as the position associated with set point 105-6. In one embodiment, the next set point is the set point in the series of stored set points. In another embodiment the next set point is determined by comparing the different set points to the camera system's current field of view and choosing a set point that corresponds to a most diametrically opposed field of view to the current set point.

At the new position associated with, for example, set point 105-6, the camera system begins searching for new objects to track such as car 204-2. In this way, the camera system does not become fixated with only one object of interest (e.g., the group 202), but continues to search for new objects to track and perform the guard tour.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of automated operation of a camera system, the method comprising:
   moving the camera system to a set point, and if objects of interest are not detected within a dwell time, then moving the camera system to another set point to search for objects of interest;
   if objects of interest are detected within the dwell time, tracking the objects of interest by controlling a positioning system of the camera system;
   after the objects of interest have been tracked for a track time as indicated by the expiration of a track timer, suspending tracking of the objects of interest; and
   in response to the expiration of the track timer, then controlling the positioning system to change the field of view of the camera system to another set point and then searching for new objects of interest to track.

2. The method according to claim 1, further comprising determining the next field of view of the camera system by retrieving another set point from a series of stored set points.

3. The method according to claim 1, further comprising determining the next field of view of the camera system based on a current field of view of the camera system after suspending tracking of a current object of interest.

4. The method according to claim 1, wherein if new objects of interest are detected, tracking the new objects of interest, and controlling the positioning system of the camera system to change the field of view of the camera system.

5. The method according to claim 4, further comprising determining the next set point of the camera system based on the current position of the camera system by choosing another set point which corresponds to a most diametrically opposed field of view.

6. The method according to claim 1, wherein the tracking of the objects of interest further includes adjusting the positioning system and a zoom actuator of the lens system to ensure that the objects of interest are zoomed and centered in the field of view of the camera system.

7. The method according to claim 1, further comprising prioritizing objects of interest when multiple objects of interest are detected and tracking the object of interest with the highest priority.

8. The method according to claim 1, wherein detecting the objects of interest includes analyzing the objects of interest based on motion, biometric information, and/or license plate information of vehicles.

9. The method according to claim 1, further comprising programming the set points into the camera system, wherein the set points correspond to different fields of view of the camera system.

10. The method according to claim 1, further comprising a system controller providing instructions to multiple security camera systems to indicate which objects of interest should be tracked by each of the camera systems to prevent the camera systems from focusing on the same object of interest.

11. The method according to claim 1, wherein each set point is a triple of a pan angle, a tilt angle, and a zoom level and are defined at a time of installation.

12. The method according to claim 1, wherein tracking includes generating positioning commands to follow the objects of interest and maintain those objects within a field of view of the camera system and keep the objects of interest zoomed and centered in the field of view of the camera system.

13. A security camera system, comprising:
   a camera controller that sends positioning commands;
   a positioning system that receives the positioning commands from the camera controller and in response moves the camera system to different set points that define fields of view of the camera system;
   a lens system and imaging sensor that generate images of the field of view of the camera system; and
   a video analysis system that detects objects of interest within the images,
   wherein if the video analysis system does not detect objects of interest within a dwell time, the positioning system moves the camera system to a new set point to search for objects of interest and if the video analysis system does detect objects of interest within the dwell time, the video analysis system tracks the objects of interest, and after the objects of interest have been tracked for a track time as indicated by the expiration of a track timer, then in response to the expiration of the track timer suspends the tracking to search for new objects of interest to track after the positioning system changes the field of view of the camera system to a new set point.

14. The system according to claim 13, wherein the video analysis system is implemented internally on the security camera system.

15. The system according to claim 13, wherein the video analysis system is implemented on an external system that accesses images stored to a network video recorder system.

16. The system according to claim 13, wherein the positioning system adjusts the field of view of the camera system and a zoom actuator adjusts a zoom position of the lens system to ensure that the objects of interest are zoomed and centered in the field of view of the camera system.

17. The system according to claim 13, wherein the video analysis system prioritizes objects of interest when multiple objects of interest are detected and tracks the object of interest with the highest priority.

18. The system according to claim 13, wherein the video analysis system detects the objects of interest by analyzing the images based on motion, biometric information, and/or license plate information of vehicles.

19. The system according to claim 13, wherein the video analysis system uses a series of the set points that correspond to different fields of view of the camera system and the positioning system then moves the camera system through the set points in the search for new objects of interest to track.

20. The system according to claim 13, wherein the video analysis system stores a series of the set points that define fields of view to which the positioning system moves the camera system.

21. The system according to claim 13, wherein the set points define fields of view that are associated with potential areas of activity including doorways, desks, and/or hallways.

22. The system according to claim 13, wherein the set points define fields of view corresponding to lens orientations and zoom levels of the camera system.

23. The system according to claim 13, wherein the positioning system moves the camera system through the set points in a predefined order during the search for new objects of interest to track.

24. The system according to claim 13, wherein the positioning system moves the camera system through the set points in a random order during the search for new objects of interest to track.

* * * * *